No. 873,874.　　　　　　　　　　　　　　　PATENTED DEC. 17, 1907.
T. S. LEITCH.
ROLLER SKATE WHEEL.
APPLICATION FILED JUNE 22, 1907.
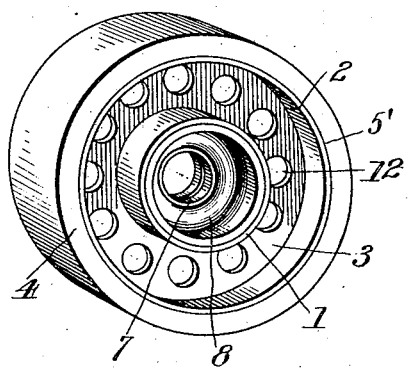
Fig. 1.
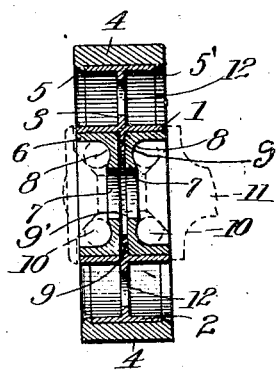
Fig. 2.
Fig. 3.
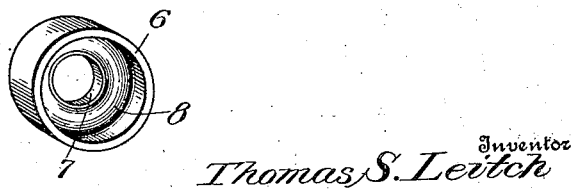
Witnesses
C. N. Walker.
J. T. Walker.
Inventor
Thomas S. Leitch
By E. E. Vrooman,
his Attorney.

UNITED STATES PATENT OFFICE.

THOMAS S. LEITCH, OF SEATTLE, WASHINGTON.

ROLLER-SKATE WHEEL.

No. 873,874.   Specification of Letters Patent.   Patented Dec. 17, 1907.

Application filed June 22, 1907. Serial No. 380,340.

*To all whom it may concern:*

Be it known that I, THOMAS S. LEITCH, a citizen of the United States, residing at Seattle, in the county of King and State of Washington, have invented certain new and useful Improvements in Roller-Skate Wheels, of which the following is a specification, reference being had therein to the accompanying drawing.

This invention relates to an improvement in roller skate wheels, and more particularly to an interchangeable ball cup and tire.

The object of the invention is the construction of a wheel particularly adapted for roller skates, which comprises a minimum number of parts, is simple and durable, and comparatively inexpensive to construct.

With these and other objects in view, the invention consists of certain novel constructions, combinations, and arrangements of parts, as will be hereinafter fully described and claimed.

In the drawings: Figure 1 is a perspective view of a wheel constructed in accordance with the present invention. Fig. 2 is a vertical, central section of the wheel depicted in Fig. 1. Fig. 3 is a perspective view of one of the interchangeable ball cups.

It is to be understood that the primary object of my invention is to reduce or minimize the cost of construction of the rollers or wheels. The aluminium rollers or wheels now manufactured are cast in a solid wheel with a permanent steel core. Furthermore, after the rim of an ordinary wheel has been slightly worn, it will break, and, therefore, the wheel has to be thrown away, entailing a loss of a solid wheel core and more aluminium than is required to make one of my tires.

With my invention, the frame constituted by parts 1, 2, and 3, hereinafter specifically described, has no wearing parts, and is perpetual or everlasting, and can be used after the tire has been worn out, by merely replacing another tire at a cost not exceeding one-third of the cost of the entire wheel.

Referring to the drawings by numerals, the single-piece frame of my wheel comprises the cylindrical hub 1, rim 2, flange 3, a rib 9. The vertical flange 3 constitutes the spokes of the wheel. The flange 3 is integrally connected to the hub 1 and cylindrical rim 2, Fig. 2. The frame is, preferably, constructed of dropped forged or cast metal, as for instance, iron or steel, whereas the tire 4 is, preferably, formed of aluminium. The tire 4 is fitted upon the periphery of the rim 2 and said tire is provided at one side with a permanent, depending, annular large flange 5, which flange fits over one of the side-edges of the rim 2, while the other smaller flange 5' is pressed from the tire in position by a die that forces the frame in said tire.

It will be noted that the rim 2 is not of the same width as the tire, but that the flanges 5 and 5' constitute a continuation of said rim, which produces a very durable and strong structure, especially as the lateral strain on the rim, when the skate is in use, will not permit the tire or rim to have independent lateral movements, as the annular flanges act as a stop and fixedly securing the tire and rim together. It will be noted that the fixedly securing of the rim 2 to the tire 4, as is accomplished by my peculiar structure, forms a very rigid connection, besides said rim materially reinforces the aluminium tire.

I, preferably, employ two interchangeable ball cups, each of which is substantially L-shaped in cross-section, see Fig. 2. Each cup comprises an annular primary portion 6 and an auxiliary portion 7. The auxiliary portion 7 is provided with an annular groove or ball-race 8. When the cups are parallel and in engagement with said hub, the inner faces of the auxiliary portions 7 are parallel, and are spaced from each other by an annular, central rib, or spacing flange that reinforces the backs of the cups, and prevents said cups from being forced by outside pressure further than their normal position. The reinforcing annular rib materially increases the strength and life of the cups, as the cups are reinforced at that portion where considerable strain is upon the same, whereas with ordinarily constructed wheels, ball-receptacles are provided with flanges on their outer edges, overlapping the outer edges of the hubs, for holding the same in position, leaving all of the strain on the weakest part of the cup, to wit: at the back, which causes the ball-cup to easily break, and it is costly to repair. These undesirable results are obviated by my peculiar structure, as will be apparent to one conversant with the art to which my invention relates.

It will be noted that the outer edges of the cups, see Fig. 2, are positioned in the same vertical plane in which the outer edges of the hub are formed, to facilitate the assembling and coöperation of the parts of the axle.

It will be obvious that owing to the similar structure of the cups, it is immaterial as to their position within the hub 1. In other words, one of the cups can be removed and the other cup inserted in its place, as said cups are interchangeable. Furthermore, a supply of these cups can be kept on hand, and as one cup is destroyed or worn out, a new cup can be inserted to take the place of the old cup.

Other advantages could be mentioned for the peculiar structure of my cups, as for instance, while they are not heavy, they form a suitable cup or pocket for the balls 10, besides reinforcing the ring-shaped or cylindrical hub 1 throughout its entire length.

A compartment 9' is formed by the reinforcing and spacing rib 9 between the backs or primary portions 6 of the ball-cups, said compartment 9' acts as a cooling means for the cups when they are heated by any friction, caused by the rotation of the balls, shown by dotted lines 10, Fig. 2.

Any suitable axle, as shown, for instance, by dotted lines 11, may be employed in connection with my improved wheel, as well as bearings carried by the axle and engaging the balls. Furthermore, for decreasing the weight of the wheel, I also provide the vertical flange 3 with apertures or openings 12.

It is to be noted that by reason of the depending, annular flanges 5 and 5' of the tire, the rim 2 is really countersunk in the aluminium tire, thereby greatly increasing the strength of the entire structure, because the tire is materially stiffened, as well as the rim is protected from any foreign object striking the same which may tend to crack or break it.

What I claim is:

1. A wheel or roller, comprising a single-piece frame, said frame comprising a cylindrical hub and a cylindrical rim, a flange integrally connecting said hub and rim at their center, a depending, annular rib integral with the central portion of said hub, a tire positioned upon said rim, and ball-cups positioned within said hub and having their backs engaging said rib.

2. A wheel or roller comprising a single-piece frame, said frame comprising a rim and a hub, a flange integrally connecting said rim and hub, a reinforcing rib formed within and integral with the hub, a tire upon said rim, and ball-cups positioned within said hub and having their backs engaging said reinforcing rib.

3. As a new article of manufacture, a roller-skate wheel, comprising a single-piece frame provided with a rim and a hub, a reinforcing rib formed within and integral with said hub, a flange integrally connecting said rim and hub at their centers, and ball-cups positioned within the hub and having their backs bearing against said rib.

4. A roller-skate wheel, comprising a single-piece frame, said frame comprising a rim and a hub integrally connected at their centers, a reinforcing rib formed in the center of and integral with said hub, ball-cups having bodies substantially L-shaped in cross-section, positioned entirely within said hub, and having their backs bearing against and reinforced by said rib and their outer ends or edges lying flush or parallel with the outer, vertical edges of said hub, and a tire engaging said rim.

5. A roller-skate wheel or roller, comprising a single-piece frame provided with a cylindrical rim and hub integrally connected intermediate their ends or edges, ball-cups positioned entirely within said hub and having their edges lying flush with the outer, edges of said hub, reinforcing and spacing means positioned between and engaging the backs of said cups and secured to the inner wall of said hub, and a tire positioned upon said frame.

In testimony whereof I hereunto affix my signature in presence of two witnesses.

THOMAS S. LEITCH.

Witnesses:
ALLAN WATSON,
R. H. LEE.